Patented Aug. 4, 1953

2,647,817

UNITED STATES PATENT OFFICE 2,647,817

METHOD OF FORMING ALKALINE EARTH METAL-BERYLLIUM DOUBLE FLUORIDE COMPOUNDS

Henry C. Kawecki, Temple, Pa., assignor to The Beryllium Corporation, Reading, Pa., a corporation of Delaware No Drawing. Application January 19, 1946,
Serial No. 642,425

4 Claims. (Cl. 23—88)

This invention relates to chemical processes and more particularly to a process for producing double alkaline earth metal-beryllium fluoride compounds, such as calcium, barium and strontium double fluoride salts of beryllium.

An object of the invention is to provide a commercially practical method of producing alkaline earth metal-beryllium double fluoride compounds.

Another object is to provide a commercially practical method of producing the barium-beryllium double fluoride compound having the composition formula $Ba.Be.F_4$.

Other objects will be apparent as the invention is more fully hereinafter disclosed.

In accordance with these objects I have discovered that the alkaline earth metal-beryllium double fluoride compounds may be formed as an insoluble precipitate by adding an alkaline earth metal chloride (in aqueous solution) to an aqueous soution of sodium-beryllium double fluoride ($Na_2BeF_4$) when the pH of the solution is maintained acid preferably to a pH of between 4 and 5, and the temperature of the solution is maintained within the range 20–100° C.

Heretofore in the art, the alkaline earth metal-beryllium double fluoride compounds have been known and the utility of these compounds in the fusion electrolysis method of producing metallic beryllium and in other ways, has been generally recognized. However, so far as I am aware, no method has heretofore been proposed whereby these compounds may be produced in an economically practical manner from aqueous solution.

I have discovered that these alkaline earth metal double fluoride compounds of beryllium may be formed in and precipitated from aqueous solutions of the alkali metal double fluoride salt of beryllium, and that this step may be incorporated in and made a part of an economically practical ore treatment process, all as will be more fully hereinafter disclosed.

In accordance with the present invention beryl ore is treated in accordance with the sintering method of my prior Patent No. 2,312,297, issued February 23, 1943, which patent is assigned to the same assignee as the present application, and the double alkali metal-beryllium fluoride compound formed thereby is dissolved in water and the solution obtained is filtered free of insoluble materials, all as is disclosed in my said prior patent.

The double fluoride solution thus obtained generally contains insufficient sodium fluoride to combine with all of the beryllium fluoride present in the solution to form the compound $Na_2BeF_4$ and most generally contains sodium fluoride and beryllium fluoride in the relative amounts intermediate between the compounds $NaBeF_3$ and $Na_2BeF_4$.

Two alternate practices are available to one skilled in the art, in accordance with the present invention:

(1) The alkali metal-beryllium double fluoride solution may be fortified with additional sodium fluoride to provide the correct ratio of two molar weights of sodium fluoride for each molar weight of beryllium fluoride present in the solution to form the salt $Na_2BeF_4$, the solution then acidified to a pH of about 4, preferably with HCl, and then precipitated with acidified barium chloride solution in an amount providing one molar weight $BaCl_2$ for each molar weight of $BeF_2$ and each two molar weights of $NaF$ present in the solution.

(2) The alkali metal-beryllium double fluoride solution may first be acidified with HCl to a pH of about 4, the acidified solution precipitated with said barium chloride solution, in an amount approximating that theoretically required to precipitate all the beryllium, and sodium fluoride solution then may be added to the solution in an amount required to complete the precipitation of the beryllium fluoride as the alkaline earth metal double fluoride compound.

Of these two practices the latter practice appears more practical for commercial use and as a specific embodiment of the present invention a typical example of the practice of this latter procedure will be given.

In accordance with the teaching of my said prior patent I first form, by the method therein disclosed, an aqueous solution containing sodium fluoride and beryllium fluoride in the relative proportions intermediate between those forming the compounds $NaBeF_3$ and $Na_2BeF_4$ in said aqueous solution.

In general, such a solution usually contains $BeF_2$ in an amount approximating 3.72 grams BeO per liter. This solution is heated to about 80–90° C., acidified to a pH of between 4 and 5 with hydrochloric acid, and to the heated acidified solution an aqueous solution of barium chloride ($BaCl_2$), acidified with HCl to a pH of 4–5, in total amount providing about 37.12 grams $BaCl_2.2H_2O$ per liter of original double fluoride solution is run into the double fluoride solution while maintaining the mixture of solutions at a temperature of 80–90° C.

The particular concentration of the barium chloride solution may vary widely without essential departure from the present invention, as may also the temperature of precipitation. The reaction involved essentially is that conforming to the following equation—

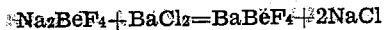
$$Na_2BeF_4 + BaCl_2 = BaBeF_4 + 2NaCl$$

This reaction occurs at all temperatures within the range 20–100° C. By varying the temperature of precipitation, within the range 20–100° C., the concentration of the BaCl₂ solution, the concentration of the double fluoride solution and the rate of BaCl₂ addition to the double fluoride solution, the particle size of the precipitated barium-beryllium double fluoride may be varied over a relatively wide range. Such variations, however, appear to have no major effect upon the completeness of the precipitation. The completeness of precipitation of the Be content of the solution appears to be primarily dependent upon the presence of NaF and BeF₂ in the proper relative proportions to form the salt Na₂BeF₄ (or 2NaF·BeF₂) and the maintenance of an acid pH sufficient to suppress the formation of oxide, hydroxide or oxy-halide salts.

Following the addition of all of the barium chloride solution to the sodium-beryllium fluoride solution, a solution of sodium fluoride containing about 30 grams NaF per liter is added slowly to the heated solution until no further precipitation of the BaBeF₄ compound can be detected, which result is obtained when the NaF, BeF₂ and BaCl₂ approximates that of the above equation.

My experiments have indicated that when 132 liters of the acid sodium beryllium fluoride solution is precipitated in this manner with 16 liters of an acid BaCl₂ solution containing 300 grams BaCl₂·2H₂O per liter, it requires about 7 liters of a sodium fluoride solution, containing 30 grams NaF per liter, to complete the precipitation of the BeF₂ content of the solution as the double alkaline earth metal salt. The total yield of BaBeF₄ salt obtained approximates the theoretical yield to be expected or, in the example given, 4380 grams.

The BaBeF₄ salt, being relatively heavy, settles rapidly and filters relatively easily except when of extremely small particle size clogging up the filter pores, and is substantially insoluble in the supernatant sodium chloride solution and in water. It may be readily washed free of the supernatant sodium chloride solution.

In place of BaCl₂, I may employ CaCl₂ or SrCl₂ to form the corresponding calcium or strontium double fluoride salts or compounds, of equal insolubility in sodium chloride solutions and in water, as one skilled in the art will readily perceive. These double alkaline earth metal-beryllium fluoride salts are of particular utility in the fusion electrolysis production of metallic beryllium and are reducible by metallic magnesium in accordance with the method of my co-pending application Serial No. 623,604, filed October 20, 1945, which application also is assigned to the same assignee as the present application.

It is believed apparent from the above disclosure that the invention may be widely modified without essential departure therefrom and all such modifications and adaptations of the invention are contemplated as may fall within the scope of the following claims:

What I claim is:

1. The method of producing an alkaline earth metal-beryllium double fluoride which comprises acidifying an aqueous solution to a pH of about 4 to 5, acidifying an aqueous solution of an alkali metal-beryllium double fluoride to a pH of about 4 to 5, and admixing the two acidified solutions at a temperature within the range of about 20° to 100° C. with the resulting precipitation of the alkaline earth metal-beryllium double fluoride.

2. The method according to claim 1 wherein the solutions are admixed at a temperature within the range of 80° to 90° C.

3. The method of producing barium-beryllium fluoride which comprises acidifying a solution of barium chloride to a pH of about 4 to 5, acidifying a solution of sodium-beryllium fluoride to a pH of about 4 to 5, and admixing the two acidified solutions at a temperature within the range of about 20° to 100° C. with the resulting precipitation of barium-beryllium fluoride.

4. The method according to claim 3 wherein a solution of sodium fluoride is added to the admixture of barium chloride and sodium-beryllium fluoride solutions in amount sufficient to complete the precipitation of the barium-beryllium fluoride.

HENRY C. KAWECKI.

References Cited in the file of this patent

Ser. No. 428,794, Gadeau (A. P. C.), published June 14, 1943.

Mellor, Inorganic and Theoretical Chemistry, vol. 1, p. 391, (1922). Published by Longmans, Green and Co., London.